J. ARDO.
VALVE MECHANISM.
APPLICATION FILED APR. 16, 1920.

1,421,119.

Patented June 27, 1922.

INVENTOR
Joseph Ardo

UNITED STATES PATENT OFFICE.

JOSEPH ARDO, OF NEWHALL, WEST VIRGINIA.

VALVE MECHANISM.

1,421,119.   Specification of Letters Patent.   Patented June 27, 1922.

Application filed April 16, 1920.   Serial No. 374,332.

*To all whom it may concern:*

Be it known that I, JOSEPH ARDO, citizen of the United States, residing at Newhall, in the county of McDowell and State of West Virginia, have invented certain new and useful Improvements in Valve Mechanism, of which the following is a specification.

This invention relates to a valve mechanism for use in connection with any apparatus where two fluids are mixed before feeding to a desired point, to automatically shut both feed pipes in the event of failure of the supply of one fluid.

The invention has for an object to provide a novel form of valve mechanism for the above purpose.

For further comprehension of the invention, and of the objects and advantages thereof, reference will be had to the following description and accompanying drawings, and to the appended claims in which the various novel features of the invention are more particularly set forth.

Figure 1:
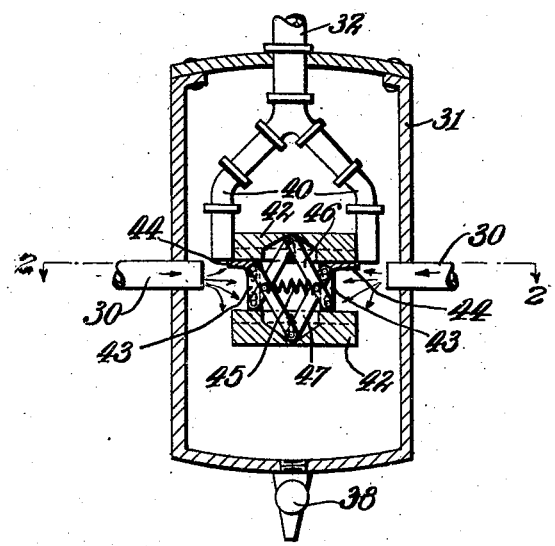
Figure 2:
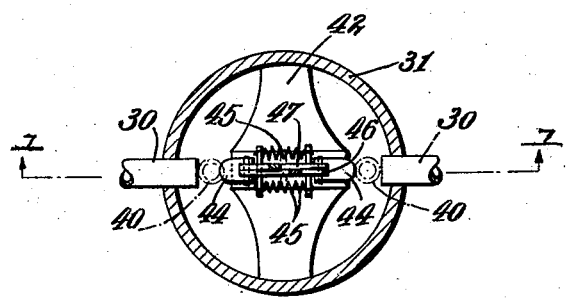

Fig. 1 of the drawings is a detail axial sectional view of my improved valve mechanism, this view being taken on the line 1—1 of Fig. 2.

Fig. 2 is a horizontal sectional view thereof, taken on the line 2—2 of Fig. 1.

My improved valve mechanism comprises a tank 31 into diametrically opposite sides of which lead a pair of pipes 30 leading from any sources of fluid supply. The mixed fluid is discharged through a pipe 32 which is separated in the tank 31 into two branches 40 whose open ends are located adjacent the pipes 30. Extending across the tank are a pair of guide plates 42 in which are guided, to have movement in unison toward and away from the respective pipes 30, a pair of plunger elements 43 having outturned flanges 44 at their upper ends adapted to project across and control the openings to the lower ends of the pipe branches 40, these plunger elements being normally pressed away from one another in the guide plates 42, to positions with the valves 44 closing the pipes 40, by means of expansion springs 45 located therebetween and bearing thereagainst. The plungers 43 are caused to move in unison by means of two pairs of toggle links comprising an upper pair 46 connected at their upper ends by slot and pin connections in a recess in the upper plate 42 and connected at their lower ends by slot and pin connections to the respective plunger elements, and a lower pair 47 similarly connected at their lower ends to the lower plate 40 and at their upper ends to the plunger elements.

In the operation of the valve mechanism, the fluid entering into the tank through both pipes 30 causes, by the impingement thereof on the plunger elements 43, the ends of the pipes 40 to be uncovered, permitting the fluid to escape by the discharge pipe 32. In the event of failure of the supply of fluid through either of the pipes 30 the total pressure on the springs 45 will be lessened and the latter will therefore expand and cause the valves 44 to close the pipes 40.

Having thus described my invention what I claim as new and desire to protect by Letters Patent of the U. S. is as follows:

1. A valve mechanism for the purpose specified comprising a tank, a pair of pipes leading into opposite sides of said tank, a second pair of pipes having their intake ends located near the discharge ends of the first pair of pipes, valves controlling the entrance to the second pair of pipes, and means normally urging said valves toward closed position, said means being adapted to be acted upon by the fluid flowing from the first pair of pipes to hold the valves open.

2. A valve mechanism for the purpose specified comprising a tank, a pair of pipes leading into opposite sides of said tank, a second pair of pipes having their intake ends located near the discharge ends of the first pair of pipes, valves controlling the entrance to the second pair of pipes, and means normally urging said valves toward closed position, said means being adapted to be acted upon by the fluid flowing from the first pair of pipes to hold the valves open said means including plunger elements on which said valves are mounted, guides for said plunger elements, a spring pressing said plunger elements apart, and toggle links connected to the respective plunger elements to cause them to move in unison.

In testimony whereof I have affixed my signature this 12th day of April, 1920.

JOSEPH ARDO.